United States Patent [19]

Pearson et al.

[11] Patent Number: 5,255,891
[45] Date of Patent: Oct. 26, 1993

[54] ELECTRICALLY OPERATED BY-PASS WATER VALVE

[75] Inventors: James E. Pearson, Downers Grove; Norman E. Zerndt, Palatine, both of Ill.

[73] Assignee: Eaton Corporation, Cleveland, Ohio

[21] Appl. No.: 692,875

[22] Filed: Apr. 29, 1991

[51] Int. Cl.⁵ .................. F16K 31/04; F16K 31/53; F16K 1/22
[52] U.S. Cl. .................. 251/129.11; 251/249.5; 251/308
[58] Field of Search .......... 123/41.02, 41.08, 41.09, 123/41.1; 137/549.1, 625.29, 865, 870, 875; 165/35; 251/129.11, 249.5, 250.5, 305, 308, 306; 237/8 A, 123 B

[56] References Cited

U.S. PATENT DOCUMENTS

| | | | |
|---|---|---|---|
| 4,003,403 | 1/1977 | Nehring | 251/309 |
| 4,241,897 | 12/1980 | Maezawa | 251/306 |
| 4,243,203 | 1/1981 | Mack | 251/305 |
| 4,361,170 | 11/1982 | Peloza | 251/305 |
| 4,540,457 | 9/1985 | LaValley | 251/305 |
| 4,930,455 | 6/1990 | Creed et al. | 251/129.11 |

*Primary Examiner*—George L. Walton
*Attorney, Agent, or Firm*—R. A. Johnston

[57] ABSTRACT

A servomotor actuated engine coolant valve with a plastic body and a thin resilient butterfly plate valve member formed of plastic material internally with a shaft hub drum having the motor shaft received therethrough for torque transmission to the butterfly plate. The butterfly plate is configured to have sufficient resiliency to absorb servomotor overtravel in the valve closed position.

21 Claims, 4 Drawing Sheets

ELECTRICALLY OPERATED BY-PASS WATER VALVE

BACKGROUND OF THE INVENTION

The present invention relates to electrically operated valves of the type employed for controlling flow of engine coolant in a vehicle equipped with a heat exchanger such as a passenger compartment heater core. The heated engine coolant or hot water is typically circulated through the passenger compartment heater core upon opening of the valve and, circulation is prevented to the heater core upon closure of the valve, although the heater core remains filled with coolant.

In such automotive heater applications for a water valve, it has been found desirable to use a butterfly type valve to provide better flow velocity profile; and, the resultant flushing effect produced thereby in order to reduce the buildup of sediment and deposits in the heater core. A bypass circulation arrangement has also been found highly desirable for automotive heater core valving.

In modern automotive passenger compartment heating systems, it has been found desirable to provide for modulation of the heater core water valve in order to provide for the necessary response of the heating system to enable adequate regulation of the passenger compartment temperature. This is particularly desirable and necessary where the passenger compartment heating system employs a heater core fluidically in series with an air conditioning evaporator in the blower discharge plenum. In such series or "stacked-core" systems it has been found necessary to provide fine resolution of modulation of the water valve position where a butterfly type valve is employed in order to maintain adequate regulation of the passenger compartment temperature.

In order to provide fine resolution of the water valve position, it has been found desirable to employ an electric servomotor to control the position of the water valve. It has therefore been desired to provide a simple, reliable electrically operated bypass water valve which is low in manufacturing cost and yet provides a high degree of resolution of valve position with low power consumption.

It has further been desired to provide a butterfly type electrically actuated bypass water valve for vehicle passenger compartment heater cores which is simple to assemble during manufacture and which is constructed in a manner to minimize the effects of deposit buildup on the butterfly valve. Heretofore, butterfly type water valves employed for controlling flow to automotive passenger compartment heater cores have employed a metal butterfly plate attached to a metal shaft and typically seating against valving surfaces provided in a plastic valve body. This arrangement has been found to be particularly susceptible to leakage because the metal butterfly plate does not completely seal against the valve seating surface due to non-uniformities in the valve seating surface. Thus it has been desired to provide some resiliency in the butterfly plate.

Heretofore butterfly type water valves for controlling flow to automotive heater cores have necessitated that the metal butterfly plate be welded to the shaft upon insertion of the parts into the valve body and subsequently sonically vibrated to effect a seating of the butterfly against the valve seating surfaces of the valve body. This procedure has proved to be troublesome and costly in mass production and particularly in the high volume production of such valves required for heater cores used in vehicle passenger compartments.

It has thus been desired to provide a high resolution electrically-operated bypass type water valve for automotive heater core applications which is easily assembled and low in manufacturing cost, yet provides reliable sealing of the butterfly plate to prevent leakage of engine coolant to the heater core when the valve is in the closed position.

SUMMARY OF THE INVENTION

The present invention provides a unique, low cost electrically operated water valve which is easy to assemble in mass production and which employs a plastic body and plastic butterfly plate member with an integrally formed hub having surfaces thereon drivingly engaging corresponding surfaces formed on a non-metallic shaft pivotally received through the body. A servo actuator housing has portions thereof integrally formed with the body and a cover attached thereto. The servo actuator includes a relatively high rpm subfractional horsepower electric motor driving a gear train which employs a plastic worm driving a metallic worm gear with an output pinion which in turn engages a non-metallic output gear attached to the butterfly shaft. A metal wiper provided on the output gear contacts resistive material mounted on the gear housing to form a potentiometer and thereby provide an output position feedback signal.

The plastic butterfly plate and integral hub-shaft construction provides an inexpensive valve construction and further provides for improved seating of the butterfly plate against the valve seating surfaces provided on the inner periphery of the body to minimize leakage. The plastic butterfly plate possesses an inherent resiliency which absorbs any overtravel of the servomotor. The overall numerically high gear reduction ratio between the motor shaft and the butterfly shaft provides for a high degree of positioning accuracy of the butterfly valve member; and, the servo produces a relatively high output torque for a low-torque low power consumption motor.

DETAILED DESCRIPTION

Figure 1:
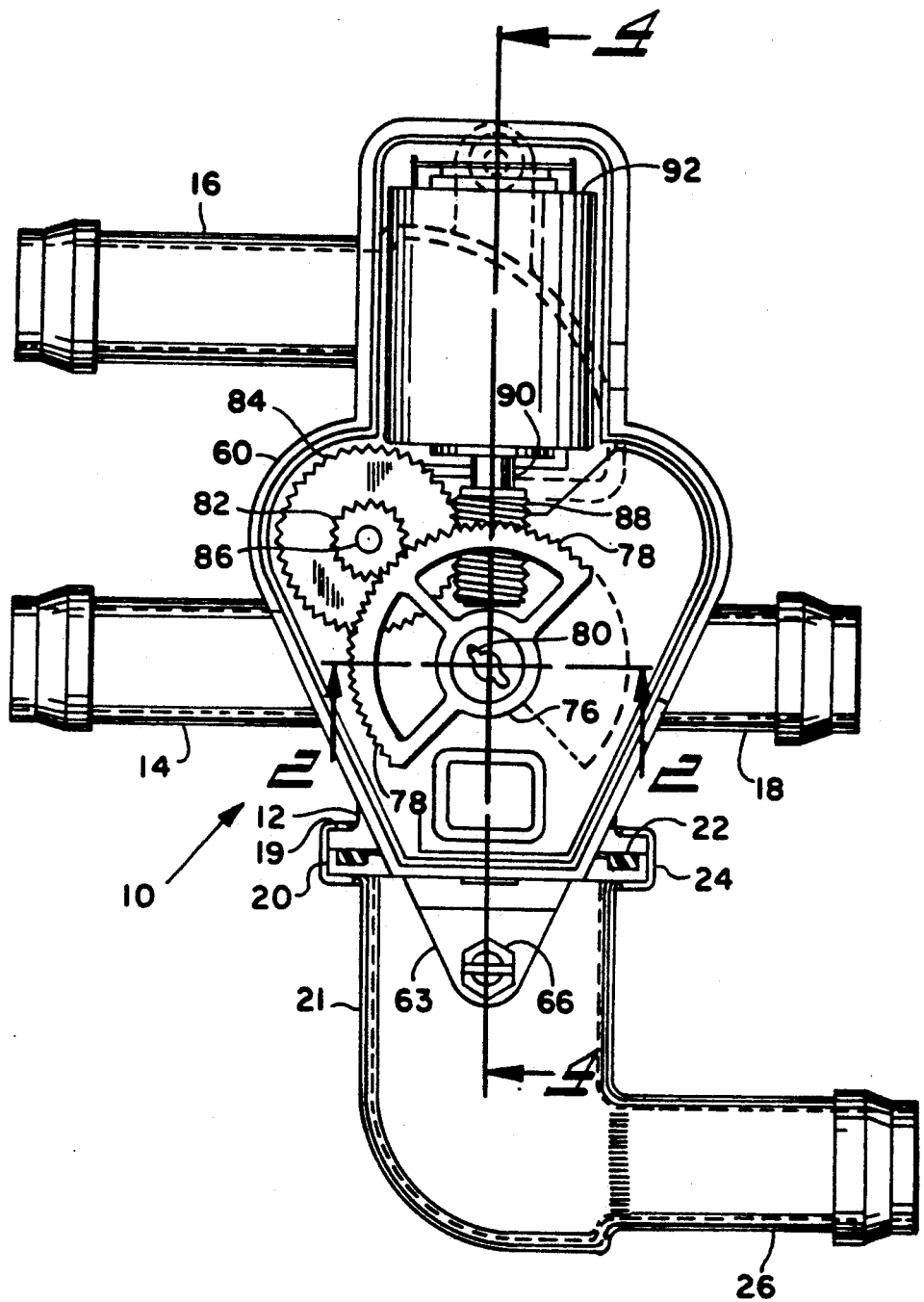
FIG. 1 is a plan view of the valve assembly with the servomotor cover removed.
Figure 5:
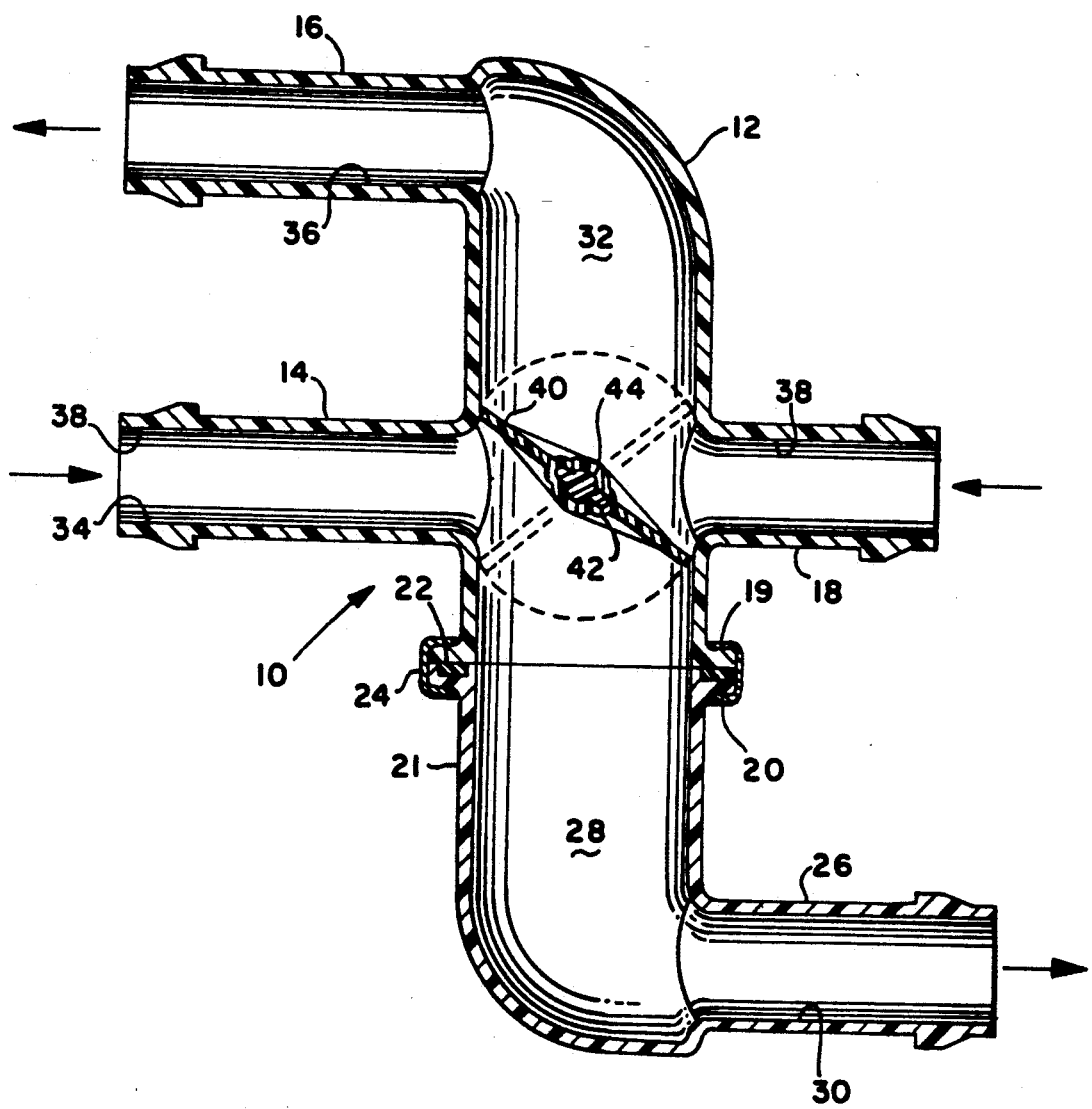

Referring to FIGS. 1 and 5, the valve assembly is indicated generally at 10 as having a body 12 with an inlet fitting 14 and a return flow fitting 16 and a heater core return fitting 18 is disposed directly opposite the inlet fitting 14. The body 12 has a flange 19 and an outlet adaptor portion 21 attached thereto by a suitable flange 20 sealed by a seal ring 22 and secured to the body flange 19 by a suitable clamp band 24. The outlet adapter 21 has a heater outlet fitting 26 attached thereto and a hollow interior 28 which communicates with a passage 30 formed in fitting 26 and also with the hollow interior 32 which forms the valving chamber of the body 12.

Each of the fittings 14, 16, 18 has a passage denoted respectively 34, 36, 38 which communicates with the valving chamber 32.

Figure 2:
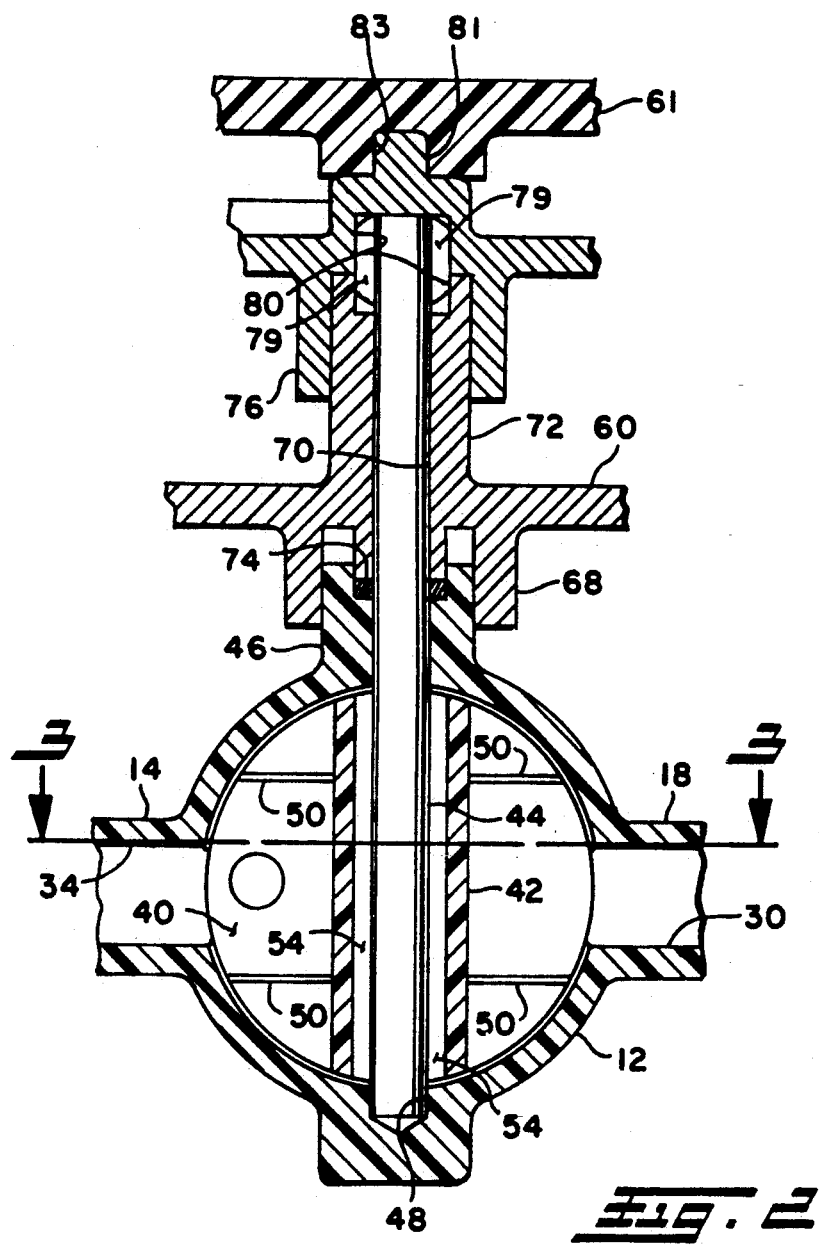
FIG. 2 is a section view taken through section indicating lines 2—2 of FIG. 1.
Figure 3:
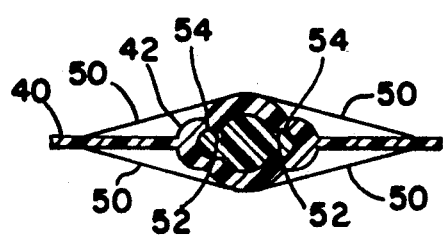
FIG. 3 is a section view taken along section indicating lines 3—3 of FIG. 2.

Referring to FIGS. 2, 3, and 5, valving member comprising a butterfly plate 40 is disposed for pivotal movement in chamber 32; and, the plate 40 has a central hub 42 which has shaft 44 received therethrough. The shaft 44 extends outwardly of the body through a boss 46 formed thereon and is journalled at its opposite end in blind bore 48 provided in the wall of the body 12.

Referring particularly to FIGS. 2 and 3, the hub 42 has a plurality of gussets 50 extending outwardly therefrom on opposite sides of the hub in butterfly plate 44 providing torque transmitting stiffness between the hub and the plate 40. The hub 42 has the transverse section thereof formed with outwardly extending flange portions 52 formed integrally therein on opposite sides thereof. The shaft 44 similarly has flanges 54 formed thereon which have a configuration corresponding to the hub portions 52 such that the shaft flanges 54 provide rotational driving engagement between the shaft 44 and the hub 42.

Referring to FIG. 5, the butterfly plate 40 is shown in solid outline in the "OPEN" position in which flow from the engine cooling system, as for example, the water pump outlet, enters passage 34 and is diverted through adaptor passage 28 and outwardly through passage 30 to a heat exchanger, such as a passenger compartment heater core. Flow returning from the heater core reenters the valve through passage 38 and is diverted by the opposite side of butterfly plate 40 through the opposite end of body passage 32 and outwardly through passage 36 typically for return to the engine water pump inlet.

When the butterfly plate has been rotated to the "CLOSED" position shown in dashed outline in FIG. 5, flow entering the valve through passage 34 from the engine water Referring to FIGS. 2, 3, and 5, valving member comprising a butterfly plate 40 is disposed for pivotal movement in chamber 32; and, the plate 40 has a central hub 42 which has shaft 44 received therethrough. The shaft 44 extends outwardly of the body through a boss 46 formed thereon and is journalled at its opposite end in blind bore 48 provided in the wall of the body 12.

Referring particularly to FIGS. 2 and 3, the hub 42 has a plurality of gussets 50 extending outwardly therefrom on opposite sides of the hub in butterfly plate 44 providing torque transmitting stiffness between the hub and the plate 40. The hub 42 has the transverse section thereof formed with outwardly extending flange portions 52 formed integrally therein on opposite sides thereof. The shaft 44 similarly has flanges 54 formed thereon which have a configuration corresponding to the hub portions 52 such that the shaft flanges 54 provide rotational driving engagement between the shaft 44 and the hub 42.

Referring to FIG. 5, the butterfly plate 40 is shown in solid outline in the "OPEN" position in which flow from the engine cooling system, as for example, the water pump outlet, enters passage 34 and is diverted through adaptor passage 28 and outwardly through passage 32 to a heat exchanger, such as a passenger compartment heater core. Flow returning from the heater core reenters the valve through passage 38 and is diverted by the opposite side of butterfly plate 40 through the opposite end of body passage 32 and outwardly through passage 36 typically for return to the engine water pump inlet.

When the butterfly plate has been rotated to the "CLOSED" position shown in dashed outline in FIG. 5, flow entering the valve through passage 34 from the engine water pump is diverted directly to the portion of body chamber 32 so as to flow outwardly from the body through passage 36 and return directly to the water pump inlet.

In the presently preferred practice, the butterfly plate 40 and shaft 44 are formed of polysulfone plastic material filled with about thirty percent (30%) by volume of glass particles; however, other suitable plastic materials may also be employed having adequate resistance to anti-freeze chemicals employed in engine coolant water and resistance to the temperatures encountered in circulating the coolant. The body 12 and adaptor 21 are preferably formed of polyester or plastic material filled with about thirty percent (30%) by volume of glass particles; however, other plastic materials suitable for use in the chemical and temperature environment in circulating the engine coolant may also be employed.

As shown in FIG. 3, and as described above, the butterfly plate 44 is formed relatively thin and of plastic material, and possess an inherent resiliency which enables it to absorb any overtravel of the motor.

Figure 4:
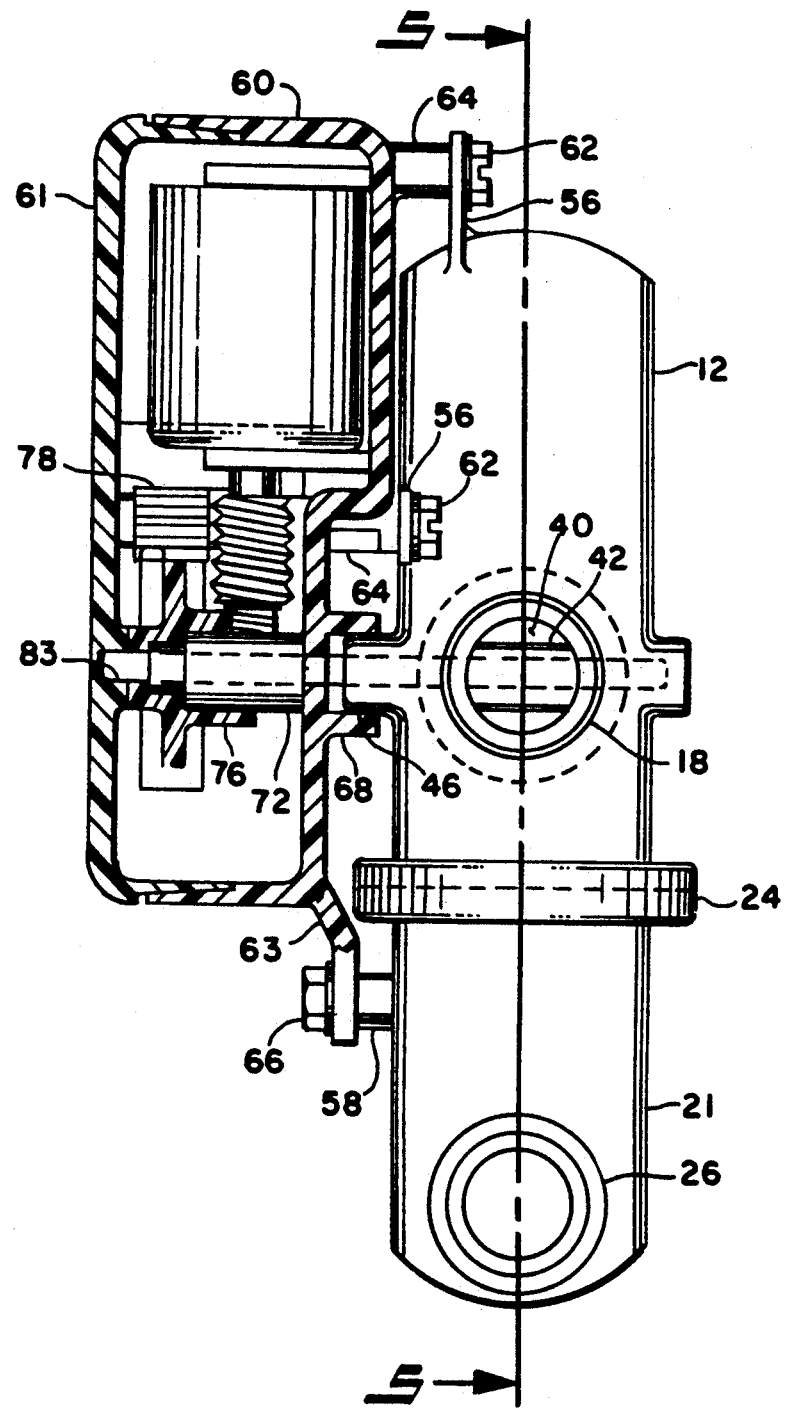
FIG. 4 is a partial section view taken along section indicating lines 4—4 of FIG. 1; and, FIG. 5 is a section view taken along section indicating lines 5—5 of FIG. 4.

Referring to FIGS. 1, 2, and 4, body 12 has a plurality of spaced mounting tabs 56 extending from the outer surface thereof. Adaptor 21 has a mounting boss 58 extending from the outer surface thereof with a gear housing or case 60, with removable cover 61, which case 60 attached to the valve body 12 and adaptor 21 by a plurality of screws 62 received through lugs 56 and threadedly engaging correspondingly positioned bosses 64 provided on the gear casing. Similarly, a screw 66 is received through a tab 63 extending outwardly from a gear case 60 and the screw 66 threadedly engages the boss 58.

Gear casing 60 has an annular projection 68 extending from the outer surface face of the base thereof; and, the projection engages and is registered on the outer periphery of the boss 46 on body 12. Shaft 44 is received through a bore 70 provided in the gear casing; and, the shaft extends upwardly in FIG. 2 through a stanchion or post 72 provided on the interior of the gear casing 60. A suitable resilient seal ring 74 is provided about the shaft 44 and is registered in a recess provided in the end of the boss 46 on the valve body.

Shaft 44 extends outwardly of the boss 72 and has received thereon in driving engagement the hub 76 of output sector gear 78, the hub being journalled on the stanchion 72. The end of shaft 44 has provided thereon a plurality of flutes 79 which engage correspondingly shaped recess 80 provided in the hub 76 for driving engagement of the hub with the shaft 44. Output gear hub 76 has a stub shaft 81 extending therefrom which is journalled in a bore 83 provided in gear case cover 61.

Referring to FIGS. 1 and 4, output sector gear 78 is engaged by a pinion 82 which is integrally formed with and attached to worm gear 84 and which is journalled on a pin 86 mounted on the gear case. The worm gear 84 is driven by worm 88 mounted on shaft 90 which extends from drive motor 92 which is mounted in the gear case along with the gears 78, 86, 84, and 88.

In the present practice of the invention, motor 92 is a low power subfractional horsepower direct-current motor having a shaft speed of about 3000 rpm. The output sector gear is preferably formed of polyimide plastic filled with about thirty percent (30%) by volume of glass particles. The pinion 82 and worm gear 84 are preferably integrally formed of die cast zinc; and, the motor worm 88 is preferably formed of polyimide plastic filled thirty percent (30%) by volume of glass particles. The worm 88 and output sector gear 78 may, however, be formed of any suitable plastic material, whereas the pinion 82 and worm gear 84 are necessarily formed of metal. In the present practice the gear train has an overall reduction of at least 100:1 between the motor shaft and output gear. An output gear position feedback potentiometer (not shown) may also be employed in any suitable manner known in the art. Although zinc has been chosen as the preferable metal, as it permits the pinion and worm gear to be formed integrally by die casting, it will be understood that other metals may be employed.

The present invention thus provides a low cost high resolution electrically operated butterfly type bypass valve with a non-metallic valve plate and shaft for improved resistance to valve seating surface buildup of foreign matter in the fluid to be valved.

Although the invention has been hereinabove described with respect to the illustrated embodiments, it will be understood that the invention is intended as limited only by the following claims.

We claim:

1. A servomotor actuated valve assembly comprising:
   (a) housing means formed of non-metallic material defining a valving chamber with valve seating surfaces and defining an inlet and outlet communicating with said chamber;
   (b) a valve member formed of non-metallic material disposed in said valving chamber and pivotally movable between an open position permitting fluid communication between said inlet and said outlet and a closed position contacting said seating surfaces and preventing fluid communication between said inlet and outlet, said valve member comprising a central hub portion with an integrally formed relatively thin resilient plate portion extending therefrom and having integrally formed therewith means providing torque transmitting stiffness between said hub and said plate, said plate portion having inherent resiliency and adapted to absorb any servomotor overtravel in said closed position;
   (c) shaft means received through said valve member hub portion and extending exteriorly of said valving chamber, said shaft means operative to engage said hub portion and transmit torque to said valve member hub; and,
   (d) motor means operatively connected to said shaft means, for, upon energization, effecting movement of said valve member between said first and second positions.

2. The valve assembly defined in claim 1, wherein said input gear is a worm.

3. The valve assembly defined in claim 1, wherein said input gear comprises a wormed formed of polysulfone plastic material.

4. The valve assembly defined in claim 1, wherein said reduction gear is formed of die cast zinc material.

5. The valve assembly defined in claim 1, wherein said output gear is formed of polyimide material partially filled with glass particles.

6. The valve assembly defined in claim 1, wherein said train of gears provide an overall speed reduction of at least 100:1 between said input and output gears.

7. The valve assembly defined in claim 1, wherein said housing means includes a valve body, a gear box structure attached thereto and a cover snap-locked onto said gear box structure.

8. The valve assembly defined in claim 1, wherein said output gear is formed of polyimide material having a fill of about thirty percent (30%) by volume of glass particles.

9. The valve assembly defined in claim 1, wherein said valve member is formed by polysulfone plastic material.

10. The valve assembly defined in claim 1, wherein said shaft means includes a rod formed of non-metallic material.

11. The valve assembly defined in claim 1, wherein said shaft means includes a rod having a portion thereof having at least one driving surface thereon, and said valve member is drivingly engaged to said driving surface for movement with said shaft means.

12. The valve assembly defined in claim 1, wherein said housing means is formed of polyimide plastic material partially filled with glass particles.

13. The valve assembly defined in claim 1, wherein said shaft means is formed of plastic material.

14. The valve assembly defined in claim 1, wherein said shaft means is formed substantially of polysulfone plastic material.

15. The valve assembly defined in claim 1, wherein said shaft means is formed of polysulfone plastic material partially filled with glass particles.

16. The valve assembly defined in claim 1, wherein said shaft means is formed of polysulfone plastic material filled about thirty percent (30%) by volume with glass particles.

17. The valve assembly defined in claim 1, wherein said shaft means includes a torque transmitting surface formed thereon; and, said valve member comprises a butterfly plate having an integrally formed hub thereon, said hub having torque receiving surfaces thereon operatively engaging said torque transmitting surfaces for effecting rotation of said butterfly plate in response to rotation of said shaft means.

18. The valve assembly defined in claim 1, wherein said housing means is formed of polyester material having about thirty percent (30%) by volume fill of glass particles.

19. A servoactuated valve assembly comprising:
   (a) housing means formed of non-metallic material defining a valving chamber and defining an inlet and outlet communicating with said chamber;
   (b) a valve member formed of non-metallic material disposed in said valving chamber and pivotally movable between an open position permitting fluid communication between said inlet and said outlet and a closed position preventing fluid communication between said inlet and outlet, said valve member comprising a hub portion having integrally formed torque transmitting surfaces formed on the inner periphery thereof and having integrally formed therewith a relatively thin resilient plate portion extending from said hub and means providing torque transmitting stiffness between said hub and said plate portion;
   (c) shaft means having formed thereon co-operative surfaces and received through said valve member hub portion and extending exteriorly of said valving chamber, said shaft means operative to have said co-operative surfaces engage said torque transmitting surfaces in said hub portion and transit torque to said valve member; and, (d) motor means operatively connected to said shaft means, for, upon energization, effecting movement of said valve member between said first and second positions; and, (e) said housing means includes means defining seating surfaces for said valve member in said closed positions, said valve member plate portion adapted to absorb any overtravel of said motor means when said valve member plate contacts said seating surfaces.

20. The valve assembly defined in claim 19, wherein said valve member plate portions includes a plurality of stiffeners extruding outwardly from said hub portion.

21. The valve assembly defined in claim 19, wherein said valve member hub has the transverse section thereof formed with outwardly extending flange portions formed integrally thereon; and, said shaft means includes torque transmitting means engaging said hub flange portions.

* * * * *